(12) United States Patent
Finley

(10) Patent No.: US 6,257,534 B1
(45) Date of Patent: Jul. 10, 2001

(54) LADDER RACK ASSEMBLY

(75) Inventor: Alfred Lee Finley, Forth Worth, TX (US)

(73) Assignee: Fibre Body Industries INC, Keller, TX (US)

( * ) Notice: Subject to any disclaimer, the term of this patent is extended or adjusted under 35 U.S.C. 154(b) by 0 days.

(21) Appl. No.: 09/261,088

(22) Filed: Mar. 2, 1999

(51) Int. Cl.[7] .................................................. F16M 11/00
(52) U.S. Cl. ........................... 248/201; 248/503; 182/127
(58) Field of Search ................................... 248/201, 552, 248/231.9, 503; 182/127

(56) References Cited

U.S. PATENT DOCUMENTS

| | | | |
|---|---|---|---|
| 1,890,940 | * | 12/1932 | Fox ....................................... 248/201 |
| 2,080,527 | * | 5/1937 | Bixel .................................... 182/127 |
| 2,134,823 | * | 1/1938 | Herrmann et al. .................... 248/503 |
| 3,672,612 | * | 6/1972 | Laing, Jr. ......................... 248/361 R |
| 4,262,834 | * | 4/1981 | Nutt ..................................... 224/324 |
| 4,390,117 | * | 6/1983 | Fagan ................................... 224/310 |
| 5,052,198 | * | 10/1991 | Watts ...................................... 70/58 |
| 5,758,851 | * | 6/1998 | Remmers ............................. 248/251 |

* cited by examiner

*Primary Examiner*—Anita M. King
*Assistant Examiner*—Walter Landry

(57) ABSTRACT

A ladder support assembly includes a ring-shaped support structure and a support bracket attached to a utility truck for supporting a ladder thereon. The support bracket has a locking structure which locks a ladder supported on the bracket against longitudinal, vertical and outwardly movement thereby assuring non-displacement of the ladder during transport thereof.

2 Claims, 2 Drawing Sheets

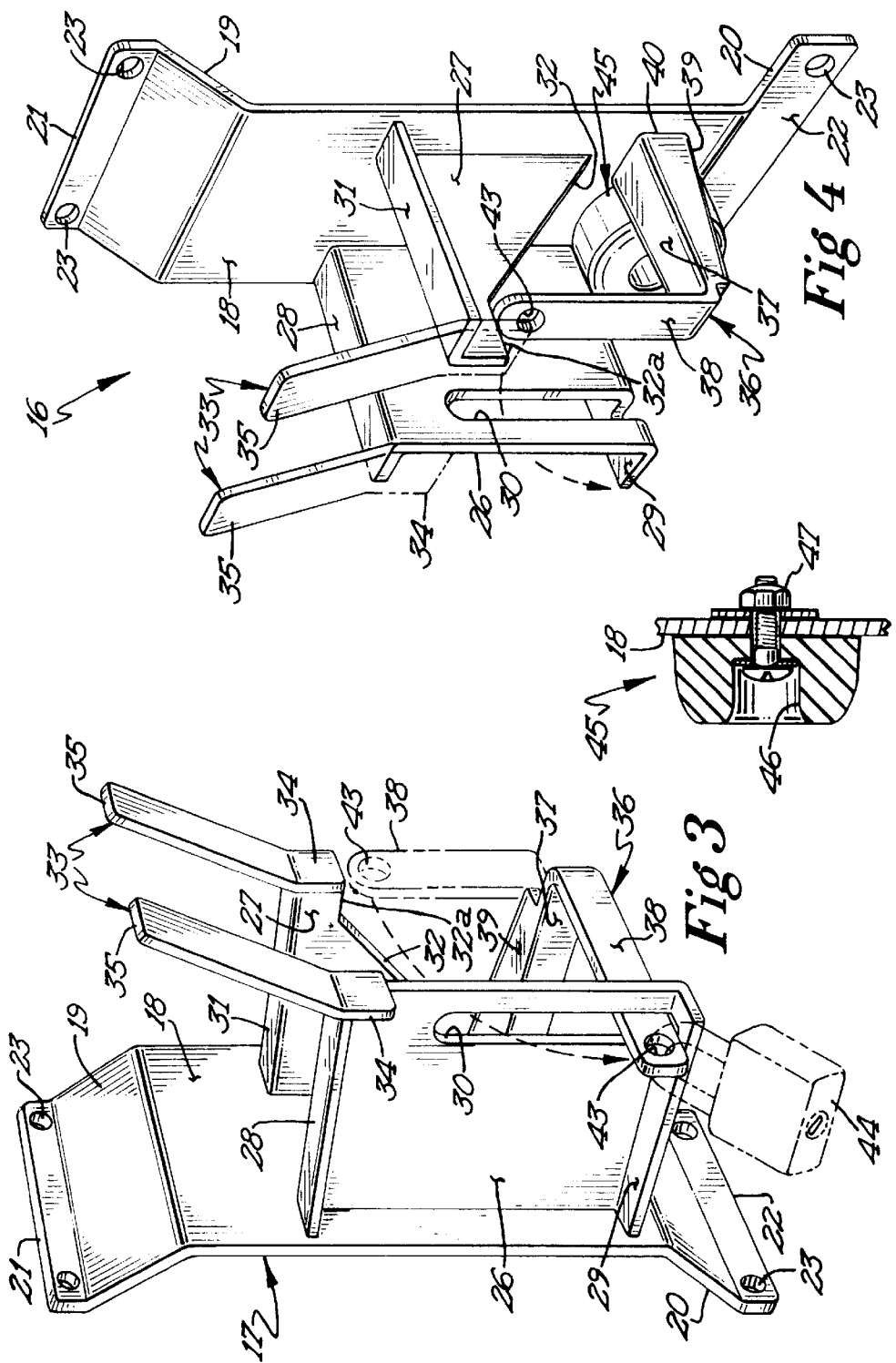

LADDER RACK ASSEMBLY

FIELD OF THE INVENTION

This invention relates to a ladder rack assembly and more particularly to a ladder rack assembly for supporting a ladder on a utility truck.

BACKGROUND OF THE INVENTION

Many utility trucks make provision for ladder supports for supporting ladders on the exterior of the trucks. Many of these supports are formed of metal but are constructed so as to make loading and unloading difficult.

SUMMARY OF THE INVENTION

It is an object of this invention to provide a novel and improved ladder rack assembly including a bracket and a support loop formed of metal and coated with fast set polyurea thereby making the support assembly capable of supporting and locking all types of fiberglass, wood and aluminum ladders.

Another object of this invention is to provide a novel ladder support assembly having a novel locking device which permits ready locking and unlocking of a ladder supported on the support assembly.

A further object of this invention is to provide a novel and improved ladder support assembly which is arranged and constructed for relatively easy vertical loading and unloading of a ladder.

BRIEF DESCRIPTION OF THE FIGURES OF THE DRAWINGS

FIG. 3 is a perspective view of the ladder support assembly bracket with certain parts thereof illustrated in an adjusted position by dotted line configuration.

FIG. 4 is another perspective view of the ladder support assembly bracket; and

FIG. 5 is a cross-sectional view of the bumper of the ladder support assembly bracket.

DESCRIPTION OF THE PREFERRED EMBODIMENT

Figure 1:
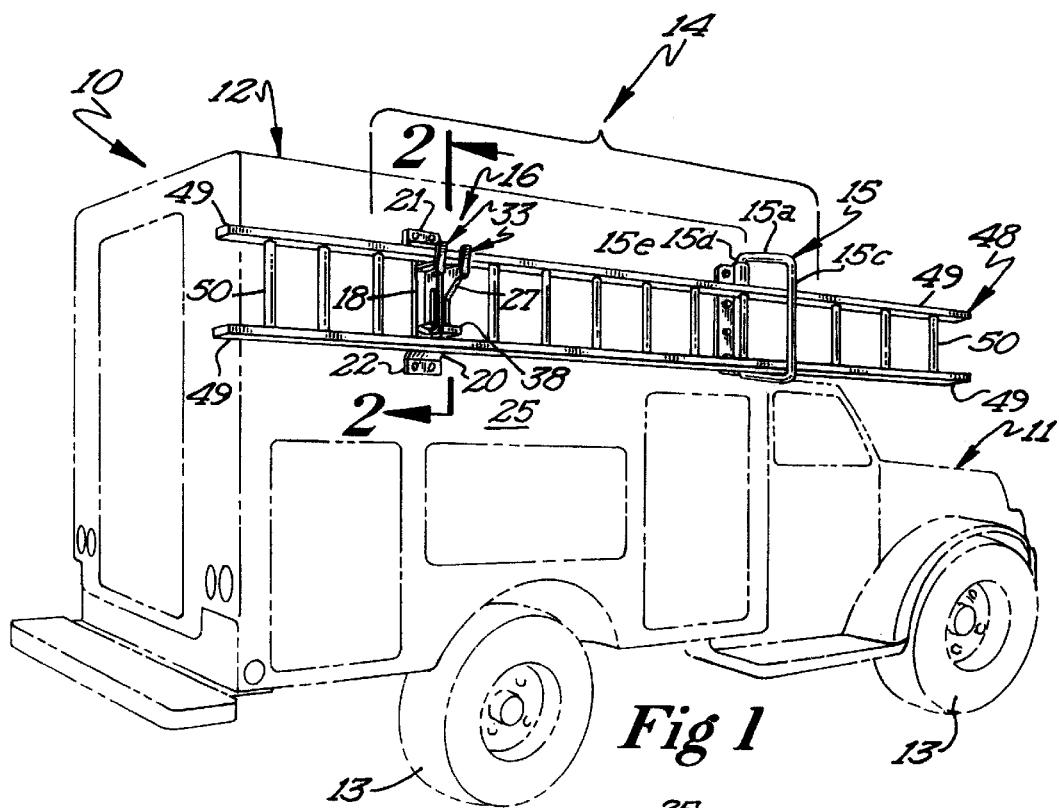
FIG. 1 is a rear perspective view of a utility truck having the novel ladder support assembly mounted thereon and supporting a ladder.

Referring now to the drawings and more particularly to FIG. 1, it will be seen that one embodiment of the novel ladder support assembly, designated generally by the reference number 14, is illustrated in mounted relation on a utility truck 10. The truck 10 is of conventional construction and includes a cab 11 and a utility truck body 12 mounted on a chassis.

The novel ladder support assembly 14 includes support structure 15 and a support bracket 16 which are secured to a vertical wall of the utility truck. The support structure 15 is of annular or loop configuration and includes an upper, horizontal support element 15a, a lower horizontal support element 15b, an outer vertical support element 15c, and an inner vertical support element 15d. An attachment plate 15e is wrapped around and secured to the inner vertical support element 15e and is secured to the side wall of the truck body. The support structure 15 is coated with a fast set polyurea which provides a highly durable, shore D hardness of 50.

The support bracket 16 includes a generally, rectangular, vertically disposed bracket plate 17. The bracket plate 17 is comprised of a flat, rectangular, vertically disposed central portion 18, an upper inclined portion 19, a lower inclined portion 20, an upper, terminal portion 21, and a lower terminal portion 22. The terminal portions are disposed in plane substantially parallel to the central portion 17 and are provided with openings 23 for accommodating bolts 24 there through to permit attachment of the bracket 16 to the side wall 25 of the utility truck body.

The bracket 16 also includes a generally rectangular supporting an retaining plate 26 and a generally triangular supporting and retaining plate 27. The plate 26 is of substantially flat configuration and has a flat upper flange 28 and a flat lower flange 29 integral therewith and projecting therefrom. The plate 27 is also of flat configuration and has a flat upper flange 27 integral therewith and projecting therefrom. It will be noted that the upper flange 28 of plate 26 and the upper flange 31 of plate 27 are disposed in substantially coplanar relation.

Plate 26 has a vertical slot 30 therein located adjacent the outer edge thereof. Plate 27 has an inclined lower edge 32 which extends from the central portion 18 of bracket plate 17 and terminates in a straight terminal portion 32a. Plate 26 and 27 are each provided with elongate hook elements 33 each including an attachment portion 34 and an upwardly and outwardly extending portion 35.

The support bracket 16 is also provided with an L-shaped locking structure 36 comprised of U-shaped attachment portion 37 and an elongate flat locking portion 38. The attachment portion 37 is provided with a web portion and downturned side flanges 39 and a downturned end flange 40. The locking structure is pivotally connected to central portion 18 of the support plate 17 by a pivot bolt 41. The pivot bolt is provided with a head and is secured against disengagement by a nut 42.

Referring now to FIGS. 3 and 4, it will be seen that the locking structure 36 is pivotal between a locking position, illustrated in full line configuration in FIG. 3, and a release position, illustrated in full line configuration in FIG. 4. It will be noted that when the locking structure is in the locking position the elongate locking portion 38 is horizontally disposed and projects though the slot 30 and rests upon flange 29 of plate 26. The inner downturned side flange 39 is disposed in coplanar relation with the plane of the plate 27 when the locking structure is in the release position. When the locking structure is in the locking position, the web portion of the attachment is disposed substantially coplanar with plate 27. The outer or upper end of the locking portion is provided with an opening 43 therein for accommodating a padlock 44. It further be noted that the locking portion 38 extends across the space defined between plates 26 and 27. Finally, it will be noted that the locking portion swings below the plate 27 to vertical position when the locking structure is in the release position.

Figure 2:
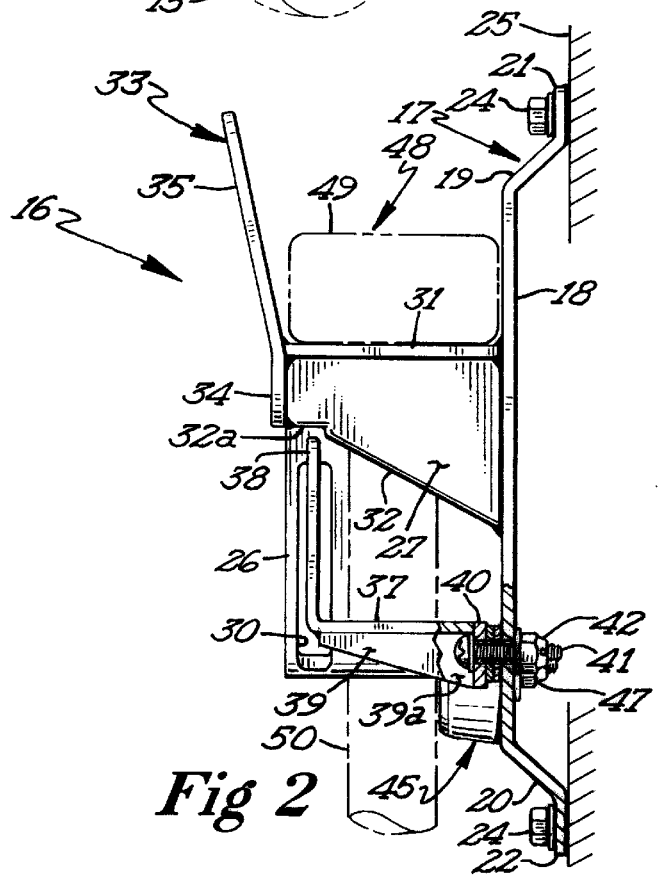
FIG. 2 is an end elevational view of the ladder support assembly bracket with certain parts broken away for clarity and depicting the ladder supported thereon in dotted line configuration.

The support bracket 16 is also provided with a generally cylindrical bumper 45 formed of a yieldable material such as rubber. The bumper has a central recess 46 in one surface thereof. The opposite surface of the bumper 45 is flat as best seen in FIG. 2. The bumper 45 is secured to the outer or front surface of the central portion 18 of plate 17 adjacent the bottom thereof.

In use, the ladder support assembly 14 supports a conventional ladder 48 for transport by a utility truck 10 or similar vehicle. The ladder 48 is comprised of opposed, elongate parallel rails 49 rigidly interconnected by rungs 50. When a ladder 48 is supported on the ladder support assembly 14, one rail 49 rests upon the flanges 28 and 31 of the plates 26 and 27 as best seen in FIG. 2. The opposite rail hangs below the support bracket 16 but is supported on the lower support element 15b of the support ring 15. One rung 50 extends downwardly between and beyond plates 26 and 27. It is pointed out that when the ladder 48 is mounted or loaded on the ladder support assembly 14, the locking structure will be in the unlocked position (FIG. 4) allowing a rung 50 to pass between plates 26 and 27 as the ladder vertically loaded on the support bracket 16. The locking structure 36 will then be swung to the locking position to position locking portion 38 in obstructing relation with respect to outward singing movement of a rung 50 positioned between plates 26 and 27. A padlock 44 may be applied through the opening 43 to provide extra theft protection.

It is pointed out that support bracket 16 is also provided with a polyurea fast set coating identical to that coating the ring shaped support structure 15. Thus the support bracket 16 is provided with a highly durable, shore D hardness for use in handling the loading, unloading and vibration of all types of wood, aluminum and fiberglass ladders.

The rail 49 of ladder 48 supported on the flanges 28, 31 of plates 26, 27 will be positioned between the hook or retaining elements 33 and the central portion 18 of plate 17 adjacent the upper portion thereof. The support bracket 16, when in the locked position, prevents displacement of the ladder from the bracket in vertical, longitudinal or outward directions. The ring-shaped support structure 15 also prevents outward and vertical displacement of the ladder supported thereon.

Thus it will be seen that a novel and improved ladder support assembly has been provided that permits easy and ready loading and unloading any conventional type of ladder for transport by a utility truck or van. It will therefore be seen that a novel and improved ladder support assembly has been provided which is not only of simple and inexpensive construction but one which functions in a more efficient manner than any heretofore known comparable support systems.

What is claimed is:

1. A ladder support assembly for the use in attachment to a vertical wall of a utility truck for supporting fiberglass, wood or aluminum ladders thereon including extension and step ladders, comprising, a ladder support assembly including a support and retaining structure and a support bracket, means for securing said support and retaining structure and said support bracket to a vertical wall of a utility truck in spaced apart relation with respect to each other, said support and retaining structure and said support bracket cooperating with each other to engage, support and confine a ladder thereon, said support bracket including a pair of vertically disposed supporting and retaining plates, means securing said plates together in spaced apart relation, the upper surface of each supporting and retaining plate defining a support surface for engaging and supporting a rail of a ladder thereon such that a rung of the ladder will extend downwardly between said supporting and retaining plates, one of said plates having a vertical slot therein, an L-shaped locking structure pivotally connected to said bracket and including a locking portion and an attachment portion, said locking structure being pivotal between locking and release positions, said locking portion when in the locking position extending between said supporting and retaining plates and through said vertical slot and being disposed in obstructing relation with respect to the rung positioned between said plates to thereby lock the ladder against removal from the bracket, said locking portion when in the released position being disposed in unobstructing relation with respect to the rung positioned between the plates.

2. The ladder support assembly as defined in claim 1 wherein said locking portion has an aperture therethrough for accommodating a padlock for locking the locking structure in the locking position.

\* \* \* \* \*